(12) United States Patent
Pierce et al.

(10) Patent No.: US 8,021,607 B2
(45) Date of Patent: Sep. 20, 2011

(54) METHODS FOR INHIBITING CORROSION IN AQUEOUS MEDIA

(75) Inventors: Claudia C. Pierce, Trenton, NJ (US); Philip D. Deck, Glenside, PA (US); Rosa Crovetto, Wayne, PA (US); Beena George, Bangalore (IN); Rajendra Prasad Kalakodimi, Bangalore (IN); Guruprasad Sundararajan, Karnataka (IN); Donald Wayne Whisenhunt, Jr., Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 12/263,015

(22) Filed: Oct. 31, 2008

(65) Prior Publication Data

US 2010/0111757 A1 May 6, 2010

(51) Int. Cl.
*C23F 11/00* (2006.01)
(52) U.S. Cl. .................. 422/17; 422/7; 422/15; 422/16; 252/387; 252/388; 252/394; 252/395; 252/396
(58) Field of Classification Search ................ 422/7, 15, 422/16, 17; 252/387, 388, 394, 395, 396
See application file for complete search history.

(56) References Cited

U.S. PATENT DOCUMENTS

| | | | |
|---|---|---|---|
| 2,529,177 A | 11/1950 | Nieland et al. | |
| 2,529,178 A | 11/1950 | Nieland et al. | |
| 2,999,732 A | 9/1961 | Kahler et al. | |
| 3,589,859 A | 6/1971 | Foroulis | |
| 3,696,044 A | 10/1972 | Rutledge | |
| 3,910,951 A | 10/1975 | Fuerst et al. | |
| 3,959,168 A | 5/1976 | Germscheid et al. | |
| 3,962,109 A | 6/1976 | Oberhofer et al. | |
| 3,965,024 A | 6/1976 | Schmadel et al. | |
| 4,020,101 A | 4/1977 | Geffers et al. | |
| 4,029,577 A | 6/1977 | Godlewski et al. | |
| 4,085,060 A | 4/1978 | Vassileff | |
| 4,113,498 A | 9/1978 | Rones et al. | |
| 4,120,655 A | 10/1978 | Crambes et al. | |
| 4,303,568 A | 12/1981 | May et al. | |
| 4,328,180 A | 5/1982 | Hansen | |
| 4,372,870 A | 2/1983 | Snyder et al. | |
| 4,512,552 A | 4/1985 | Katayama et al. | |
| 4,588,786 A | 5/1986 | Kadono et al. | |
| 4,634,532 A | 1/1987 | Logan et al. | |
| 4,654,159 A | 3/1987 | Bush et al. | |
| 4,659,481 A | 4/1987 | Chen | |
| 4,717,499 A | 1/1988 | Chen | |
| 4,798,675 A | 1/1989 | Lipinski et al. | |
| 4,841,069 A | 6/1989 | Olsen | |
| 5,073,299 A | 12/1991 | Cook | |
| 5,183,590 A | 2/1993 | Carter et al. | |
| 5,256,332 A | 10/1993 | Kessler | |
| 5,468,393 A | 11/1995 | Zidovec et al. | |
| 5,683,588 A | 11/1997 | Pomrink et al. | |
| 5,693,290 A | 12/1997 | Kessler et al. | |
| 5,866,042 A | 2/1999 | Chen et al. | |
| 5,916,379 A | 6/1999 | Varley et al. | |
| 6,365,774 B1 | 4/2002 | O'Lenick, Jr. | |
| 6,572,789 B1 | 6/2003 | Yang et al. | |
| 6,585,933 B1 * | 7/2003 | Ehrhardt et al. | ................. 422/16 |
| 6,642,192 B1 | 11/2003 | O'Lenick, Jr. | |
| 7,094,852 B2 | 8/2006 | Solov et al. | |

FOREIGN PATENT DOCUMENTS

| | | |
|---|---|---|
| CA | 840626 | 4/1970 |
| DE | 10047291 A1 | 4/2002 |
| EP | 0 652 305 A1 | 10/1995 |
| GB | 852 958 | 11/1960 |
| JP | 59-222588 | 12/1984 |
| JP | 2005-217776 | 8/2005 |

OTHER PUBLICATIONS

International Search Report issued in connection with corresponding PCT Application No. PCT/US2009/059803 on Mar. 31, 2010.

* cited by examiner

*Primary Examiner* — Jill Warden
*Assistant Examiner* — Monique Cole
(74) *Attorney, Agent, or Firm* — Wegman, Hessler & Vanderburg

(57) ABSTRACT

Methods are provided to inhibit corrosion of metals in contact with aqueous systems such as cooling water systems. In accordance with the methods, a hydroxyacid compound and orthophosphates are used to treat the system. Additionally, an adjuvant including poly(epoxysuccinic acids), an additional hydroxy acid, and a polycarboxylic acid, may be added to the system water.

5 Claims, No Drawings

METHODS FOR INHIBITING CORROSION IN AQUEOUS MEDIA

FIELD OF INVENTION

The present invention relates to the treatment of aqueous systems to reduce corrosion on the metallic surfaces in contact therewith.

BACKGROUND OF THE INVENTION

The problems of corrosion and attendant effects such as pitting have troubled water systems for years. For instance, scale tends to accumulate on internal walls of various water systems, and thereby materially lessens the operational efficiency of the system. In this manner, heat transfer functions of the particular system are severely impeded.

Corrosion is a derivative electrochemical reaction of a metal with its environment. It is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, corrosion along with pitting has proven deleterious to the overall efficiency of the system. Many cooling water systems employ orthophosphate in the system treatment to promote passivation of the metal surfaces in contact with the system water. However, current costs of phosphorus based inhibitors have skyrocketed due to increased demand of $P_2O_5$ ores for agricultural fertilizers. Also, environmental regulations in the United States and Europe have increased restriction on phosphate discharge into local rivers and streams.

Accordingly, low or no phosphate treatment programs have seen increasing use with a concurrent emphasis on all or predominantly organic treatment programs that typically require relatively higher treatment dosages (i.e., >50 ppm) to be effective. Unfortunately, these high level organic treatment dosages increase the biological food in the system (carbon footprint) and increase the need for feed of toxic biocidal compounds to the system.

The benefit of carbon footprint reduction can be viewed from two different perspectives. First, carbon footprint reduction can be viewed in terms of savings in energy consumption that otherwise would be needed to synthesize the organic inhibitor. Here, the lesser amount of organic material that need be generated results in less water, fewer emissions, etc.

Secondly, the reduction in generation of food for biological growth results in reduction in the feed levels of biocide needed to control microbial activity.

SUMMARY OF THE INVENTION

In accordance with the invention, methods are provided for inhibiting corrosion of metals in contact with an aqueous system comprising treating the system with an hydroxyacid and orthophosphate. The hydroxyacid and orthophosphate, with the $oPO_4$ either added to the system or already present in the water, are used as a combined treatment to inhibit corrosion. Additionally, an adjuvant compound can be used conjointly with the combined orthophosphate/hydroxyacid combination. The adjuvant is selected from, a poly(epoxysuccinic acid), a second hydroxyacid compound, and a polycarboxylic acid. In many cases, the orthophosphate may already be present in the system waters. The treatment is added to the aqueous system, such as a cooling water system.

DETAILED DESCRIPTION

We have discovered that hydroxy acids, when coupled with low phosphate doses, provide effective corrosion protection of low carbon steel. Additionally, an adjuvant component may be used in conjunction with the hydroxy acid/$oPO_4$. The adjuvant may be a component such as poly(epoxysuccinic acid), polymaleic acid (PMA), and polyacids, or certain other hydroxy acids may be used. The treatment components, at smaller dosages of each in the combination and at a smaller total concentration of all components achieve effective performance in protection of low carbon steel. These combinations are especially effective under cycled water conditions with moderate to high alkalinities in cooling tower applications.

In one aspect of the invention, hydroxysuccinic acids (HSA) may be used as the hydroxy acid source. These compounds are reported in U.S. Pat. No. 5,183,590; the disclosure of which is incorporated by reference herein. This family is represented by the formula

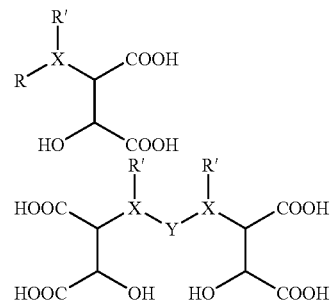

where X can be NH or O or S, R and R' are H or C1-C6 alkyl which may be optionally substituted with OH, COOH, SO3H, phenyl, C1-C6 alkyl, cycloalkyl, or phenyl which is optionally substituted with COOH, OH, SO3H and Y is selected from a group consisting of i) —(CH2)n- where n is an integer from 2 to 10 —(CH2)$_2$-Z-(CH2)$_2$- where Z is —O—, —S—, —NR"— where R" is the same as R" is selected from H, C1 to C6 alkyl, carboxy alkyl, acyl, —COOR'" is C1-C6 alkyl or benzyl and

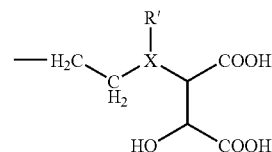

where R' is as above.

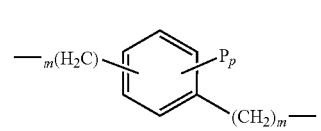

where P is H, C1 to C6 alkyl, alkoxy, halogen, —COOH, or —SO3H, m is independently 0 or 1, p is 0 or 1 and

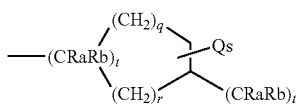

where Ra and Rb are independently H or C1 to C6 alkyl, Q is H or C1 to C6 alkyl, s is 0, 1 or 2 t is independently 0, 1, 2 or 3 r is 1 or 2 or water soluble salts thereof. Exemplary compounds include p-xylylene di hydroxy succinic acid (diHSA); m-xylylene diHSA; m-phenylene diHSA; ammonia diHSA; methylamine diHSA; piperazine diHSA; ethylenediamine diHSA; hexamethylene diHSA; hydroxylamine HSA; hexylene glycol diHSA; and ethylene glycol diHSA.

In another embodiment of the invention, the hydroxyacid is a hydroxycarboxylic compound or compounds represented by the formula

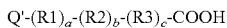

wherein a, b, and c are integers of from 0 to 6 with the proviso that (a+b+c>0); R1, R2, and R3 are repeat units in either random or block sequence and are individually chosen from C=O or CY'Z' wherein Y' and Z' are individually selected from the group of H, OH, CHO, COOH, $CH_3$, $CH_2OH$, $CH(OH)_2$, $CH_2(COOH)$, $CH(OH)(COOH)$, $CH_2(CHO)$, and CH(OH)CHO so that said B1 has a minimum of one OH group as written in its fully hydrated form. Q' in the above formula is COOH or $CH_2OH$.

Exemplary polyhydroxy carboxylic acids include D-saccharic acid, mucic acid, tartaric acid, ketomalonic acid, gluconic acid, and glucoheptonic acid.

In one aspect of the invention, we have found that low levels of phosphate, either occurring naturally in the water system or via chemical feed to the system, when combined with the hydroxy acids, can provide adequate corrosion protection. This is significant in that lower, environmentally acceptable levels of phosphate can be used while the overall treatment program provides effective protection against corrosion. In one aspect of the invention, less than 50 ppm of the combined $oPO_4$ and hydroxy acid is present in the water system. In this combination of $oPO_4$ and hydroxyacid, the $oPO_4$ is present in an amount of about 1 ppm or less.

The phosphates can be found to either naturally exist in the water system or they can be added via chemical additives. Many natural water sources around the world contain low levels of o-phosphates (such as 0.2 ppm) and under the multi-cycled condition of a water tower, the o-phosphate level in the tower may reach 1 ppm. Although this level of phosphate by itself is insufficient to provide adequate corrosion protection, we have found that in combination with certain hydroxy acids, this low phosphate level can yield acceptable corrosion rates.

Typically, the phosphates revert to orthophosphate in the water system. Orthophosphate then as may be employed in the invention may be derived from any one of a number of sources capable of generating the orthophosphate ion. Such sources include inorganic phosphoric acids, phosphonic acid salts, and organic phosphoric acid esters.

Examples of the inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which may be added, there may be mentioned aminopolyphosphonic acids such as aminotrimethylene phosphonic acid, ethylene diaminetetramethylene phosphonic acid and the like, methylene diphosphonic acid, hydroxyethylidene diphosphonic acid, 2-phosphonobutane 1,2,4, tricarboxylic acid, etc.

Exemplary organic phosphoric acid esters include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and the tri-ethanol amines.

Inorganic phosphoric acid, phosphonic acid, and organic phosphoric acid esters may be salts, preferably salts of alkali metal, ammonia, amine and so forth. A more detailed listing of exemplary orthophosphate sources may be seen in U.S. Pat. No. 4,303,568, hereby incorporated by reference.

In one aspect of the invention, a poly(epoxy succinic acid) may be employed as the adjuvant treatment component. Quite desirably, this compound has the formula

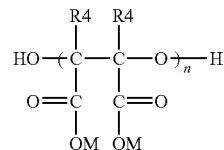

wherein M is hydrogen or a cation wherein the resultant salt is water soluble, n is from about 2-15, and each R4 is the same or different and is independently chosen from H, $C_1$-$C_4$ alkyl or $C_1$-$C_4$ substituted alkyl.

The presently preferred member of this group is polyethoxysuccinic acid (PESA) having a degree of polymerization of about 2-3 (avg. 2-5). The use of PESA is disclosed in U.S. Pat. Nos. 4,654,159 and 5,256,332. Its chemistry can be described as a polyacid. Although primarily added to cooling water chemistries as a deposit control agent, it has been recognized that this chemistry provides some modest corrosion benefit. However, in combination with hydroxy acids, the resulting corrosion inhibiting properties are greater than what may be expected based on its use alone.

Another adjuvant that can be mentioned as an alternative are the polycarboxylic acids such as PMA. We have found that PMAs that are polymerized in an aqueous media perform much better than those that have been polymerized in an organic solvent such as toluene or xylene. For example, exemplary PMAs may be polymerized in aqueous solution from maleic acid monomer in the presence of metal ions such as iron, vanadium, and/or copper with the use of hydrogen peroxide as the catalyst. One exemplary PMS is PMA 2A from SNF having a MW of about 630. Other waterborne PMAs include Aquatreat 802 available from Akzo Nobel MW≈640; and water based PMAs available from Jiangsu Jianghai. Waterborne PMAs are defined as those that have been polymerized in an aqueous medium.

Additionally, it should be noted that a second hydroxy acid compound as above defined may be employed as an adjuvant.

Typically, the hydroxyacid component and $oPO_4$ are added to the water system in an amount of about 1-50 ppm of the combination and the adjuvant or adjuvants are added or are present in the system in an amount of about 1-40 ppm. In one embodiment, a combination of hydroxy acid (1 to about 49 ppm), low dose $PO_4$ of about 1 ppm, PESA about 1-40 ppm, and PMA about 1-40 ppm may be used in combination. In one preferred embodiment, the total amount of all treatment components present is less than 50 ppm.

The invention is ideally suited, though not necessarily restricted, for open recirculating cooling systems when the pH of the aqueous media is mildly alkaline near a pH of about 7 to about 9; ideally a pH of 8. The treatment is also expected to be stable to chlorination that is done for disinfection purposes in the cooling towers. The invention is primarily for corrosion inhibition of low carbon steel, although not restricted to same and is applicable to waters having a very high hardness content when used in the presence of suitable dispersants.

The synergistic combination of hydroacid/o$PO_4$ and adjuvant may also be used in conjunction with adjuvant dispersing or threshold agents, e.g., polymers of acrylic acid or methacrylic acids, polymaleic acid, copolymers of acrylic acid with hydroxypropylacrylate (U.S. Pat. No. 4,029,577), copolymers of acrylic acid with polyethyleneglycol allyl ether (PEGAE), carboxycellulose, copolymers of maleic anhydride with sulfonated styrene, polyacrylamide and copolymers, etc. The above listed dispersing agents also include the acid salts of these materials. The hydroxyacid/adjuvant combinations may also be used in conjunction with conventional water treating agents, i.e., metal ion sequestering agents, copper corrosion inhibitors (N-alkyl 1,2,3-triazoles—U.S. Pat. No. 4,659,481), and biocides.

The method of applying the treatment includes adding each component of the combination to an aqueous system that contacts iron or copper alloys used for heat transfer. As previously stated, the o$PO_4$ may already be present in the system. Such aqueous systems are most commonly formed, cooled, and concentrated through the evaporation of naturally occurring waters. Typical pH values range from 6 to 9 with a preferred range of 7.8 to 8.8. Such waters are concurrently treated with deposit control agents to prevent scale formation as is known by those skilled in the art. In one aspect, orthophosphate content of the system can be on the order of about 0.1-50 ppm, preferably 0.1-10, more preferably 0.1-5 ppm and most preferably 0.1-1.0 ppm.

The most preferred method combines low levels of orthophosphate, PESA, and a combination of two or more hydroxy acids, one of those hydroxy acids preferably being saccharic acid. Preferred addition rates for this combined treatment are o-$PO_4$ 0.1-1 ppm; hydroxy acids 1-49 ppm; PESA 1-40 ppm and PMA 1-40 ppm.

The following examples are included as being illustrative of the invention and shall not be construed as limiting the scope thereof.

EXAMPLES

Corrosion tests were performed using the Beaker Corrosion Test Apparatus (BCTA). This test evaluates the corrosion of low carbon steel electrodes in water over an 18 hour period at a temperature of 120° F. The water chemistry is modified by the addition of soluble hardness salts, silica, and alkalinity to simulate the water chemistry of industrial cooling towers. Typically the water chemistry included:

| | |
|---|---|
| Ca | 400 ppm as $CaCO_3$ |
| Mg | 150 ppm as $CaCO_3$ |
| $SiO_2$ | 30 ppm as $SiO_2$ |
| Cl | 283 ppm as Cl |
| $SO_4$ | 450 ppm as $SO_4$ |
| M-alkalinity | 200 ppm as $CaCO_3$ |

Water pH was adjusted to 8.0 before the beginning of the BCTA test and allowed to drift during the run. Typically, the pH climbed to a value of 8.4 to 8.6 over the course of the run.

Water under this chemistry with 200 ppm M-alkalinity and 0 ppm o-phosphate, after 18 hours of testing, typically yields corrosion rates of roughly 60 mils per year (mpy) and the metal coupon appearance is badly pitted and corroded. The same water chemistry with 6 ppm o-phosphate (a chemistry typical of a commercial phosphate-based treatment) yields corrosion rates of 0.5 to 1.0 mpy with very little to no pitting. In general, corrosion rates of less than 1.0 mpy are considered acceptable.

Data generated from these experiments and shown in the following tables include mild steel corrosion rates taken at the conclusion of the 18 hour experiment as derived by an electrochemical linear polarization scan and a corrosion appearance rating of the low carbon steel test coupons exposed in these waters. The rating scale for the coupon appearance is:

| Rating | Coupon Appearance |
|---|---|
| 1 | perfect; no pits |
| 2 | 1 to 2 pits or blotchy appearance |
| 3 | 3 or more pits |
| 4 | moderate pit density |
| 5 | heavy pit density |

Coupon appearance ratings of 3 or greater are considered unacceptable.

In addition to the measured corrosion rates, for combinations of hydroxy acids with o-phosphate, with PESA, with PMA, or with other hydroxy acids, we calculated expected corrosion rates from the rates measured for these components individually at the corresponding dose using the following equation:

$$\text{mpy (expected)} = [((\text{mpy}(a))^{-1} + ((\text{mpy}(b))^{-1} + ((\text{mpy}(c))^{-1} + \ldots ((\text{mpy}(z))^{-1}]$$

where a, b, c, . . . z refer to each chemical species.

A worst case example of the resulting corrosion resistance provided by two components in the absence of synergy would be represented by the mean value of the corrosion rates for each component individually. We have chosen to calculate the threshold for synergy under a much more restrictive criterion using the equation as given above.

When an individual component exhibits a corrosion rate below 1 mpy, the calculated corrosion rate may no longer be a good measure of synergy.

Example 1

Experimental Treatments

Data in Table 1 exemplifies the corrosion resistance synergy we see for hydroxy acids in combination with orthophosphate. Example 1.1 is a typical commercial type treatment of 6 ppm o-phosphate combined with 8 ppm PESA. As commented on earlier, we obtain a corrosion rate for this water treatment chemistry of 0.69 mpy. Examples 1.2 and 1.3 demonstrate the impact o-phosphate has on corrosion resistance as the corrosion rate dramatically increases at phosphate levels of 1 or 2 ppm. The impact of this increasing corrosion with decreasing phosphate level is also observed from the deteriorating coupon appearance.

Examples 1.3 through 1.5 show the level of performance obtained with 8 ppm PESA and increasing levels of saccharic acid (SA) in the absence of o-phosphate. Only at saccharic acid doses of 35 ppm do we obtain satisfactory corrosion rates. However, when 1 or 2 ppm o-phosphate is added to these solutions we obtain lower corrosion rates than the corresponding phosphate-free water chemistries. Our threshold saccharic acid dose for acceptable corrosion performance drops from 35 ppm without o-phosphate to 15 ppm in the presence of 2 ppm o-phosphate (Example 1.10). What is more, we typically see a lower corrosion rate than is expected from the calculated combination of saccharic acid and o-phosphate.

TABLE 1

Impact of o-Phosphate with Saccharic Acid

| Example | actives in ppm | | | corrosion rate in mpy | | appearance rating |
|---|---|---|---|---|---|---|
| | [PO$_4$] | [PESA] | [SA] | calculated | measured | |
| 1.1 | 6 | 8 | 0 | | 0.69 | 2 |
| 1.2 | 1 | 8 | 0 | | 8.19 | 3 |
| 1.3 | 2 | 8 | 0 | | 2.16 | 3 |
| 1.4 | 0 | 8 | 15 | | 5.96 | 4 |
| 1.5 | 0 | 8 | 25 | | 3.20 | 1 |
| 1.6 | 0 | 8 | 35 | | 0.61 | 1 |
| 1.7 | 1 | 8 | 15 | 3.45 | 2.59 | 2 |
| 1.8 | 1 | 8 | 25 | 2.30 | 1.73 | 2 |

TABLE 1-continued

Impact of o-Phosphate with Saccharic Acid

| Example | actives in ppm | | | corrosion rate in mpy | | appearance rating |
|---|---|---|---|---|---|---|
| | [PO$_4$] | [PESA] | [SA] | calculated | measured | |
| 1.9 | 1 | 8 | 35 | 0.57 | 0.72 | 1 |
| 1.10 | 2 | 8 | 15 | 1.59 | 0.69 | 2 |
| 1.11 | 2 | 8 | 25 | 1.29 | 0.70 | 2 |
| 1.12 | 2 | 8 | 35 | 0.48 | 0.22 | 1 |

Example 2

PESA is often added as a dispersing and anti-deposition agent, but is known to possess some corrosion-inhibition properties. As seen in Examples 2.1 through 2.3, this corrosion inhibition is slight and is more evident from the appearance of the corrosion coupons than from the measured corrosion rates. Data in Table 2 shows corrosion performance for a series of hydroxy acids in the presence of 1 ppm, with and without the addition of 20 or 30 ppm PESA. Without PESA, only saccharic and mucic acids (Examples 2.4 and 2.6) demonstrate acceptable corrosion performance; all others perform poorly, except to note that ketomalonic acid (Example 2.10) yields an excellent coupon appearance rating. The addition of 20 ppm PESA to these chemistries improves corrosion resistance, yielding better performance than expected from our calculated corrosion rates. For gluconic and glucoheptonic acids, we note a much improved corrosion performance when the PESA dose is increased to 30 ppm (Examples 2.14 and 2.17, respectively).

TABLE 2

Impact of PESA with Hydroxy Acids
(All examples contain 1 ppm o-phosphate).

| Example | actives in ppm | | | | | | | corrosion rate in mpy | | appearance rating |
|---|---|---|---|---|---|---|---|---|---|---|
| | [PESA] | SA | MA | TA | KMA | GA | GHA | calculated | measured | |
| 2.1 | 10 | 0 | 0 | 0 | 0 | 0 | 0 | | 8.88 | 5 |
| 2.2 | 20 | 0 | 0 | 0 | 0 | 0 | 0 | | 3.97 | 4 |
| 2.3 | 30 | 0 | 0 | 0 | 0 | 0 | 0 | | 4.98 | 3 |
| 2.4 | 0 | 40 | 0 | 0 | 0 | 0 | 0 | | 0.81 | 1 |
| 2.5 | 20 | 40 | 0 | 0 | 0 | 0 | 0 | 0.67 | 0.33 | 1 |
| 2.6 | 0 | 0 | 40 | 0 | 0 | 0 | 0 | | 0.57 | 1 |
| 2.7 | 20 | 0 | 40 | 0 | 0 | 0 | 0 | 0.50 | 0.37 | 1 |
| 2.8 | 0 | 0 | 0 | 40 | 0 | 0 | 0 | | 9.13 | 5 |
| 2.9 | 20 | 0 | 0 | 40 | 0 | 0 | 0 | 2.77 | 2.26 | 4 |
| 2.10 | 0 | 0 | 0 | 0 | 40 | 0 | 0 | | 5.87 | 1 |
| 2.11 | 20 | 0 | 0 | 0 | 40 | 0 | 0 | 4.14 | 2.90 | 1 |
| 2.12 | 0 | 0 | 0 | 0 | 0 | 40 | 0 | | 7.60 | 5 |
| 2.13 | 20 | 0 | 0 | 0 | 0 | 40 | 0 | 2.61 | 2.07 | 3 |
| 2.14 | 30 | 0 | 0 | 0 | 0 | 40 | 0 | 3.01 | 0.53 | 2 |
| 2.15 | 0 | 0 | 0 | 0 | 0 | 0 | 40 | | 4.86 | 4 |
| 2.16 | 20 | 0 | 0 | 0 | 0 | 0 | 40 | 2.19 | 2.05 | 4 |
| 2.17 | 30 | 0 | 0 | 0 | 0 | 0 | 40 | 2.46 | 0.42 | 3 |

SA = saccharic acid
MA = mucic acid
TA = tartaric acid
KMA = ketomalonic acid
GA = gluconic acid
GHA = glucoheptonic acid Example 3

PMA (polymaleic acid) is also used as an anti-deposition agent, but its inherent corrosion inhibiting properties is less appreciated. The corrosion data in Table 3 again show the performance for several hydroxy acids at 40 ppm in the presence of 1 ppm o-phosphate, but here we show the impact of adding 20 ppm PMA. In some cases (Examples 3.3, 3.7, 3.9, and 3.11), we note a lower corrosion rate for the hydroxy acid with PMA than for the hydroxy acid alone. However, the calculated corrosion rates for Examples 3.11 and 3.13 are less than what we measure.

TABLE 3

Impact of PMA with Hydroxy Acids
(All examples contain 1 ppm o-phosphate).

| | actives in ppm | | | | | | | corrosion rate in mpy | | appearance |
|---|---|---|---|---|---|---|---|---|---|---|
| Example | [PMA] | SA | MA | TA | KMA | GA | GHA | calculated | measured | rating |
| 3.1 | 20 | 0 | 0 | 0 | 0 | 0 | 0 | | 4.75 | 4 |
| 3.2 | 0 | 40 | 0 | 0 | 0 | 0 | 0 | | 0.81 | 1 |
| 3.3 | 20 | 40 | 0 | 0 | 0 | 0 | 0 | 0.69 | 0.32 | 1 |
| 3.4 | 0 | 0 | 40 | 0 | 0 | 0 | 0 | | 0.57 | 1 |
| 3.5 | 20 | 0 | 40 | 0 | 0 | 0 | 0 | 0.51 | 0.53 | 1 |
| 3.6 | 0 | 0 | 0 | 40 | 0 | 0 | 0 | | 9.13 | 5 |
| 3.7 | 20 | 0 | 0 | 40 | 0 | 0 | 0 | 3.12 | 1.08 | 2 |
| 3.8 | 0 | 0 | 0 | 0 | 40 | 0 | 0 | | 5.87 | 1 |
| 3.9 | 20 | 0 | 0 | 0 | 40 | 0 | 0 | 2.63 | 1.59 | 1 |
| 3.10 | 0 | 0 | 0 | 0 | 0 | 40 | 0 | | 7.60 | 5 |
| 3.11 | 20 | 0 | 0 | 0 | 0 | 40 | 0 | 2.92 | 3.23 | 4 |
| 3.12 | 0 | 0 | 0 | 0 | 0 | 0 | 40 | | 4.86 | 4 |
| 3.13 | 20 | 0 | 0 | 0 | 0 | 0 | 40 | 2.40 | 4.92 | 4 |

Example 4

The data in Table 4 demonstrate the synergies among pairs of hydroxy acids (all in the presence of 1 ppm o-PO$_4$ and 10 ppm PESA). Examples 4.1 through 4.5 show a concentration profile for saccharic acid. As expected, corrosion resistance improves with increasing saccharic acid dose, with the threshold for acceptable performance occurring somewhere between 20 and 30 ppm. Likewise for other hydroxy acids, we see improving corrosion performance as hydroxy acid concentration is increased (Examples 4.6 through 4.9 for tartaric acid, Examples 4.14 through 4.17 for ketomalonic acid, Examples 4.21 through 4.24 for gluconic acid, and Examples 4.28 through 4.31). However, these acids do not perform as well as saccharic acid, and none obtain acceptable corrosion resistance levels at the highest dose (40 ppm) evaluated in these studies. (Although again we point out the startlingly good appearance for even low levels of ketomalonic acid, despite fairly high corrosion values).

The combinations of saccharic acid with these hydroxy acids demonstrate improved corrosion performance over the performance obtained with a single hydroxy acid and, in some instances, show enhanced synergy as performing better than our calculated corrosion rate.

Examples 4.35 through 4.40 show combinations of ketomalonic acid with gluconic or glucoheptonic acid. For these cases, the combined acids outperform their corresponding single hydroxy acid, but the resulting corrosion rates do not demonstrate an enhanced synergy relative to the calculated composite corrosion rate. Still, we note, as is the case with ketomalonic acid, that the coupon appearance is excellent for these combinations.

TABLE 4

Impact of Hydroxy Acids with Hydroxy Acid
(All examples contain 1 ppm o-phosphate and 10 ppm PESA).

| | actives in ppm | | | | | | corrosion rate in mpy | | appearance |
|---|---|---|---|---|---|---|---|---|---|
| Example | SA | MA | TA | KMA | GA | GHA | calculated | measured | rating |
| 4.1 | 5 | 0 | 0 | 0 | 0 | 0 | | 4.26 | 4 |
| 4.2 | 10 | 0 | 0 | 0 | 0 | 0 | | 4.42 | 4 |
| 4.3 | 20 | 0 | 0 | 0 | 0 | 0 | | 1.14 | 2 |
| 4.4 | 30 | 0 | 0 | 0 | 0 | 0 | | 0.50 | 1 |
| 4.5 | 40 | 0 | 0 | 0 | 0 | 0 | | 0.59 | 1 |
| 4.6 | 0 | 0 | 10 | 0 | 0 | 0 | | 8.37 | 4 |
| 4.7 | 0 | 0 | 20 | 0 | 0 | 0 | | 4.24 | 4 |
| 4.8 | 0 | 0 | 30 | 0 | 0 | 0 | | 2.11 | 4 |
| 4.9 | 0 | 0 | 35 | 0 | 0 | 0 | | 2.06 | 3 |
| 4.10 | 5 | 0 | 35 | 0 | 0 | 0 | 1.39 | 1.36 | 2 |
| 4.11 | 10 | 0 | 30 | 0 | 0 | 0 | 1.43 | 0.62 | 2 |
| 4.12 | 20 | 0 | 20 | 0 | 0 | 0 | 0.90 | 0.54 | 2 |
| 4.13 | 30 | 0 | 10 | 0 | 0 | 0 | 0.47 | 0.48 | 2 |
| 4.14 | 0 | 0 | 0 | 10 | 0 | 0 | | 9.14 | 3 |
| 4.15 | 0 | 0 | 0 | 20 | 0 | 0 | | 4.64 | 1 |
| 4.16 | 0 | 0 | 0 | 30 | 0 | 0 | | 3.90 | 1 |
| 4.17 | 0 | 0 | 0 | 40 | 0 | 0 | | 2.64 | 1 |
| 4.18 | 10 | 0 | 0 | 30 | 0 | 0 | 2.07 | 1.03 | 1 |
| 4.19 | 20 | 0 | 0 | 20 | 0 | 0 | 0.92 | 0.56 | 1 |
| 4.20 | 30 | 0 | 0 | 10 | 0 | 0 | 0.47 | 0.98 | 1 |
| 4.21 | 0 | 0 | 0 | 0 | 10 | 0 | | 8.70 | 4 |
| 4.22 | 0 | 0 | 0 | 0 | 20 | 0 | | 1.82 | 4 |
| 4.23 | 0 | 0 | 0 | 0 | 30 | 0 | | 4.66 | 4 |
| 4.24 | 0 | 0 | 0 | 0 | 40 | 0 | | 2.97 | 4 |
| 4.25 | 10 | 0 | 0 | 0 | 30 | 0 | 2.27 | 1.78 | 3 |
| 4.26 | 20 | 0 | 0 | 0 | 20 | 0 | 0.70 | 0.22 | 1 |
| 4.27 | 30 | 0 | 0 | 0 | 10 | 0 | 0.47 | 0.61 | 1 |

TABLE 4-continued

Impact of Hydroxy Acids with Hydroxy Acid
(All examples contain 1 ppm o-phosphate and 10 ppm PESA).

| Example | actives in ppm | | | | | | corrosion rate in mpy | | appearance rating |
| --- | --- | --- | --- | --- | --- | --- | --- | --- | --- |
| | SA | MA | TA | KMA | GA | GHA | calculated | measured | |
| 4.28 | 0 | 0 | 0 | 0 | 0 | 10 | | 5.53 | 4 |
| 4.29 | 0 | 0 | 0 | 0 | 0 | 20 | | 4.26 | 4 |
| 4.30 | 0 | 0 | 0 | 0 | 0 | 30 | | 4.64 | 4 |
| 4.31 | 0 | 0 | 0 | 0 | 0 | 40 | | 2.97 | 4 |
| 4.32 | 10 | 0 | 0 | 0 | 0 | 30 | 2.26 | 1.53 | 2 |
| 4.33 | 20 | 0 | 0 | 0 | 0 | 20 | 0.90 | 0.51 | 2 |
| 4.34 | 30 | 0 | 0 | 0 | 0 | 10 | 0.46 | 0.43 | 1 |
| 4.35 | 0 | 0 | 0 | 10 | 30 | 0 | 3.09 | 2.98 | 1 |
| 4.36 | 0 | 0 | 0 | 20 | 20 | 0 | 1.31 | 2.38 | 1 |
| 4.37 | 0 | 0 | 0 | 30 | 10 | 0 | 2.69 | 3.70 | 1 |
| 4.38 | 0 | 0 | 0 | 10 | 0 | 30 | 3.08 | 2.33 | 1 |
| 4.39 | 0 | 0 | 0 | 20 | 0 | 20 | 2.22 | 3.20 | 1 |
| 4.40 | 0 | 0 | 0 | 30 | 0 | 10 | 2.29 | 1.90 | 1 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a water system having a total amount of from about 0.1-1.0 ppm of orthophosphate therein, an improved corrosion inhibition method comprising adding to said system an effective amount to inhibit metallurgy in contact with said water system of a hydroxy acid compound having the formula $$Q'\text{-}(R1)a\text{---}(R2)b\text{---}(R3)c\text{---}COOH$$

wherein a, b, and c are integers of from 0 to 6 with the proviso that (a+b+c>0); R1, R2, and R3 are repeat units in either random or block sequence and are individually chosen from C=O or CY'Z' wherein Y' and Z' are individually selected from the group of H, OH, CHO, COOH, $CH_3$, $CH_2OH$, $CH(OH)_2$, $CH_2(COOH)$, $CH(OH)(COOH)$, $CH_2(CHO)$, and CH(OH)CHO so that said B(1) has a minimum of one OH group as written in its fully hydrated form, Q' is COOH or $CH_2OH$, said hydroxy acid being present in an amount of 1 to about 49 ppm said method further comprising adding a poly (epoxysuccinic) acid to said water system in an amount of about 1 to 40 ppm.

2. A method as recited in claim 1 wherein said water system is a recirculating cooling water system, said hydroxy acid being a member selected from the group consisting of D-saccharic acid, mucic acid, tartaric acid, ketomalonic acid, gluconic acid, and glucoheptonic acid.

3. A method as recited in claim 1 further comprising adding polymaleic acid to said water system in an amount of about 1 to 40 ppm.

4. A method as recited in claim 2 wherein said hydroxy acid is D-saccharic acid.

5. A method as recited in claim 4 wherein an additional hydroxy acid is present, said additional hydroxy acid being a member selected from the group of mucic acid, tartaric acid, ketomalonic acid, gluconic acid, and glucoheptonic acid.

* * * * *